US006634375B2

(12) United States Patent
Olivas et al.

(10) Patent No.: US 6,634,375 B2
(45) Date of Patent: *Oct. 21, 2003

(54) LEAK ARRESTING VALVE

(75) Inventors: John D. Olivas, Houston, TX (US); Mark C. Martis, Redondo Beach, CA (US); Patrick J. Cunningham, Redondo Beach, CA (US); William Ronald Martis, San Diego, CA (US); Juan Olivas, Jr., El Paso, TX (US); Ray D. Kelm, Danbury, TX (US)

(73) Assignee: Brightvalve, LLC, Redondo Beach, CA (US)

( * ) Notice: Subject to any disclaimer, the term of this patent is extended or adjusted under 35 U.S.C. 154(b) by 89 days.

This patent is subject to a terminal disclaimer.

(21) Appl. No.: 09/982,220

(22) Filed: Oct. 17, 2001

(65) Prior Publication Data

US 2002/0074042 A1 Jun. 20, 2002

Related U.S. Application Data (63) Continuation-in-part of application No. 09/634,181, filed on Aug. 9, 2000, now Pat. No. 6,374,852.

(51) Int. Cl.[7] .............................................. F16K 17/26
(52) U.S. Cl. ..................... 137/67; 137/458; 137/493.9; 137/512.3; 137/517
(58) Field of Search ...................... 137/67, 493, 493.9, 137/458, 504, 503, 512, 512.3, 512.5, 517

(56) References Cited

U.S. PATENT DOCUMENTS

| 3,344,806 A | | 10/1967 | Schultz | |
| 3,683,957 A | * | 8/1972 | Sands | 137/460 |
| 3,707,984 A | | 1/1973 | Bantz | |
| 4,257,452 A | | 3/1981 | Hill et al. | |
| 4,294,278 A | | 10/1981 | Blake | |
| 4,880,030 A | | 11/1989 | Terry | |
| 5,158,207 A | | 10/1992 | Daele | |
| 5,320,135 A | | 6/1994 | Pierrou | |
| 5,336,166 A | * | 8/1994 | Sierra | 137/504 |
| 5,365,974 A | | 11/1994 | Maravic | |
| 5,713,387 A | * | 2/1998 | Armenia et al. | 137/67 |
| 5,829,478 A | | 11/1998 | Pape et al. | |
| 6,374,852 B1 | * | 4/2002 | Olivas | 137/493.9 |

* cited by examiner

*Primary Examiner*—Stephen M. Hepperle (57) ABSTRACT

A flow control valve is disclosed wherein a housing defines a flow chamber with an inlet and an outlet. Disposed within the flow chamber is a poppet assembly comprising an inner poppet and an outer poppet. A first spring is selected to bias the outer poppet to seal closed the inlet below a predetermined fluid flow rate. Above the fluid flow rate, the force of the fluid against the outer poppet compresses the spring, breaking the seal and allowing fluid to flow into the fluid flow chamber. Inside the outer poppet is an inner poppet which extends from the outer poppet. A second spring biases the inner poppet predominantly within the outer poppet, but an increased pressure inside the outer poppet collapses the second spring and extends the inner poppet in a fully extended position. Fully extended the inner poppet shuts the outlet of the fluid chamber thereby arresting the flow. In operation, the first spring shuts the valve below a predetermined flow rate guaranteeing zero flow until a minimum flow rate is present. Furthermore, if a leak occurs downstream (beyond the outlet) or the flow rate is above a predetermined maximum flow rate the second spring is collapsed by an upstream/downstream pressure differential causing the inner poppet to seal the outlet. Thus, the valve operates only between a minimum and maximum flow rate and seals in the event of a downstream leak.

17 Claims, 6 Drawing Sheets

LEAK ARRESTING VALVE

This application is a continuation in part of U.S. patent application Ser. No. 09/634,181, filed Aug. 9, 2000, now U.S. Pat. No. 6,374,852.

BACKGROUND OF THE INVENTION

1. Field of the Invention

The present invention relates generally to flow control valves, and more particularly to a purely mechanical leak arresting flow control valve that regulates fluid flow between a minimum flow rate and a maximum flow rate, and can detect leaks below and above the minimum and maximum flow rates, respectively, and close the valve in the presence of a leak.

2. Description of Related Art

Valves used in the regulation of fluid flow are well known in the art. Valves can be used to maintain fluid flow in a particular direction, or as a safety feature to prevent too high of a flow rate or too low of a flow rate. Valves can be mechanically or electrically actuated devices that use the dynamic pressure in a fluid flow to compress a spring or move a ball, thereby allowing the fluid either to pass through the valve or be blocked by the valve.

The present invention is directed to a flow regulating valve that allows a continuous fluid flow in a predetermined range, as opposed to a pulse flow. Valves used for this purpose are useful for many applications that require a supply of a liquid or a gas, collectively a fluid, such as a washing machine, ice maker, or gas stove. The present invention includes a new feature not found in the prior art valves, namely, a purely mechanical leak detecting function. The invention is a mechanical valve that regulates the flow of fluid within a predetermined minimum and maximum flow rate, and further mechanically closes the valve when either a small or large downstream leak occurs. Thus, while prior art purely mechanical safety valves will close shut, and thereby stop the fluid flow if a major leak occurs due to the sudden increase in the fluid flow rate, the prior art valves lack the ability to close shut in the event of a small leak such as might occur due to a small breach in the downstream fluid line or the gradual failure of a downstream component. This situation could be of critical importance if, say, the fluid is hazardous or flammable, if the fluid line is not regularly maintained due to its location or conditions of use, or if subsequent damage from such a line breach would be economically or environmentally unacceptable. The response of the valve may be the only indication that a small leak has occurred. The present invention solves the problem that the prior art valves fail to address.

SUMMARY OF THE INVENTION

The present invention comprises a valve housing forming a flow chamber thereinthrough with an inlet and an outlet. Within the flow chamber is a flow arresting member comprising a pair of poppets cooperating to restrict flow at the inlet and the outlet of the flow chamber upon detection of a small or large leak downstream of the valve. The first poppet is a hollow outer poppet biased against the valve inlet by a first spring, shutting the valve to flow rates below a predetermined minimum flow rate governed by the spring constant. A second inner poppet located at least partially within the first poppet and extending through an opening in the outer poppet extends to block the outlet of the valve when a small downstream leak is detected. The second poppet is biased in the first poppet by a second spring such that the second poppet extends from the first poppet when the fluid pressure in the cavity of the first poppet exceeds the pressure at the outlet of the valve by more than a critical value determined by the second spring constant. When the second poppet fully extends from the first poppet, the second poppet plugs the outlet and closes the valve to subsequent fluid flow through the valve. This condition occurs when either a small leak or a large leak occurs downstream of the valve. Further, if a flow rate is too large, the first outer poppet will completely collapse its biasing spring such that the outlet to the valve is blocked. Thus, only a predetermined flow rate between a minimum flow rate and a maximum flow rate is permitted through the valve.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a mechanical leak arresting valve.

Figure 1:
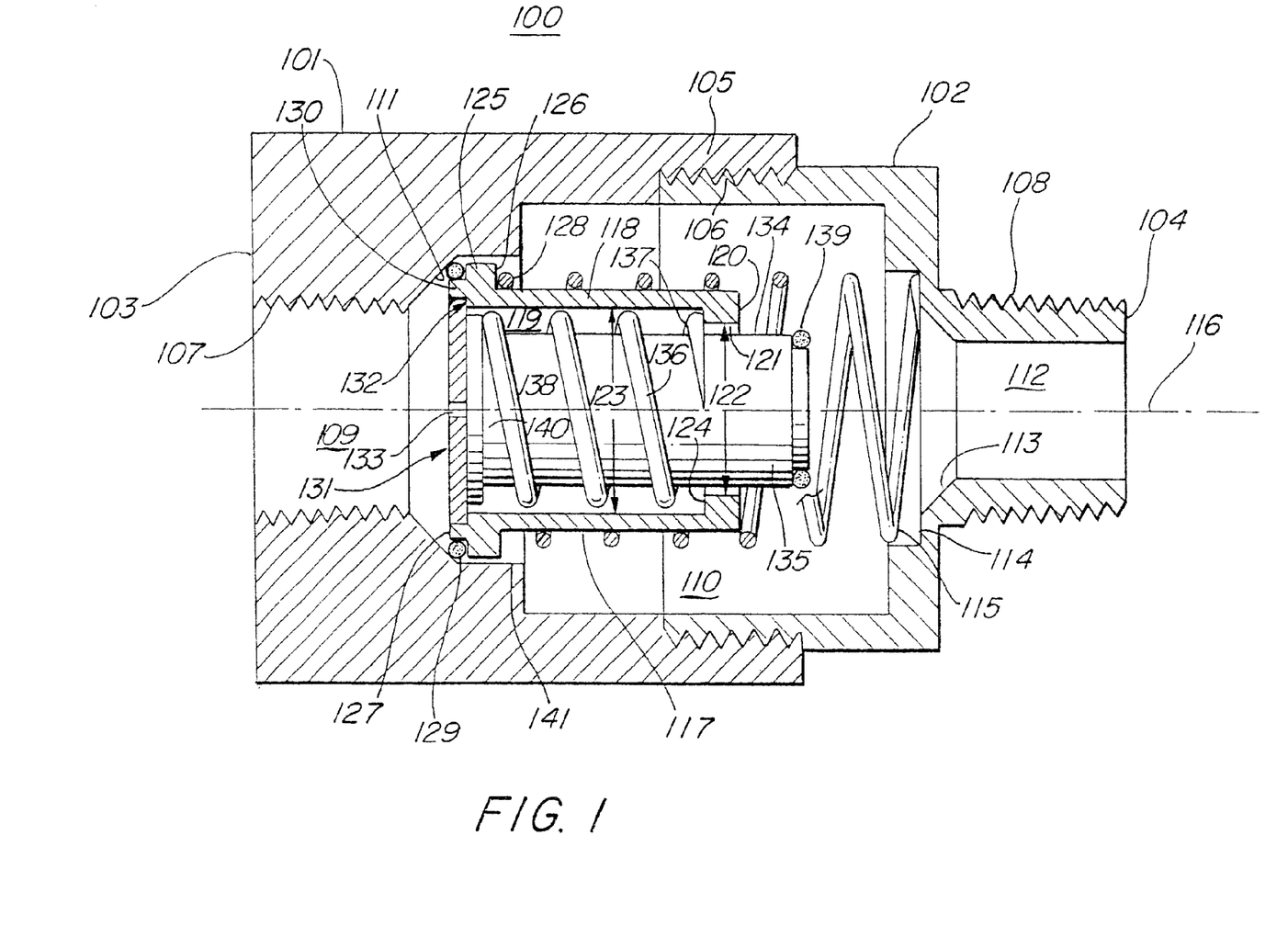
FIG. 1 is a cross sectional view of a preferred embodiment of the present invention illustrating a condition below a minimum flow rate.

FIG. 1 illustrates a valve (generally denoted 100) having a housing with an inlet side 103 and an outlet side 104. The housing is formed by two mating halves, a male half 102 with a threaded portion 106 and a female half 101 with a threaded portion 105. The two halves 101,102 engage via the mating threaded portions 105,106 to form a fluid-tight valve. The valve 100 has a threaded inlet 107 designed to receive a piping component (not shown) ultimately connected to a fluid source, and a threaded outlet 108 adapted to fit in a piping component (not shown) ultimately leading to a fluid recipient. The valve 100 serves as an intermediary between the fluid source and the fluid destination, and shuts off the supply of fluid unless predetermined flow conditions occur in the absence of a downstream leak. For purposes of this disclosure, it is understood that the term "fluid" can refer to either a liquid or a gas and the valve can be designed to operate using both mediums.

FIG. 1 shows the inlet 109 as a cylindrical passage funneling out at the entrance to the flow chamber 110 via a chamfered section 111. The chamfered section 111 terminates at the flow chamber 110, a cylindrical region within the valve housing. The outlet 112 is also depicted as a cylindrical passage opening to the flow chamber 110 via a chamfered section 113. The outlet side of the flow chamber includes a recessed region 114 just outside of the outlet chamfer 113. The recessed region 114 seats a helical spring 115 with a longitudinal axis colinear with a longitudinal axis 116 of both the valve inlet 109 and the valve outlet 112.

The helical spring 115 operates on a telescoping poppet disposed within the flow chamber 110 of the valve 100. The telescoping poppet includes an outer poppet 117 which has a hollow cylindrical body 118 that is disposed within the helical spring 115. The hollow body 118 defines a flow cavity 119 therein, and an end 120 of the hollow body 118 of the outer poppet 117 terminates in an opening 121 to the flow cavity 119. The opening 121 of the outer poppet 117 has a diameter 122 smaller than the internal diameter 123 of the flow cavity 110, defining an inner shoulder 124 at the opening 121 within the flow cavity 110. The outer poppet 117 also includes a base 125 with a cylindrical tab of a greater diameter than the outer diameter of the cylindrical body 118, defining a lip 126 adjacent the end 127 of the outer poppet 117. The end 128 of the helical spring 115 abuts the lip 126 of the outer poppet 117, and applies a force thereto in the direction of the inlet side 103 of the valve 100. Across the lip 126 of the outer poppet 117 is an o-ring 129 seated on a circumferential rim 130, where the o-ring 129 cooperates with the chamfered portion 111 of the inlet 109 to seal the valve at the inlet when the helical spring 115 forces the outer poppet 117 against the inlet 109 of the valve.

The outer poppet 117 is capped at the end 127 by an orifice plate 131 seated in a circumferential recess 132 in the end of the outer poppet 117. The orifice plate 131 includes a small orifice 133 for communicating fluid from the inlet side of the valve (when the outer poppet is held against the inlet as described above) or from the flow chamber (when the outer poppet is not held against the inlet—see FIG. 2) to the flow cavity 119 inside the outer poppet 117. Thus, the flow cavity 119 inside the outer poppet 117 is in fluid communication with the upstream fluid conditions via the orifice 133.

Within the outer poppet 117 and anchored inside the flow cavity 119 is a second, inner poppet 134. The cylindrical body 135 of the inner poppet 134 is preferably longer than the cylindrical body 118 of the outer poppet 117 such that the inner poppet 134 protrudes out of the outer poppet 117 at the opening 121 of the outer poppet 117. Further, the inner poppet 134 includes a head 140 having a diameter greater than the diameter 122 of the opening 121 of the outer poppet 117 and thus captures the inner poppet 134 inside the outer poppet 117 in a telescoping relationship. A second helical spring 136 is wrapped about the cylindrical body 135 of the inner poppet 134 with a first end 137 abutting the inner shoulder 124 of the outer poppet 117 and the second end 138 abutting the head 140 of the inner poppet 134. The force of the second helical spring 136 biases the inner poppet 134 against the orifice plate 131 in the absence of a pressure differential to collapses the spring. The cylindrical body 135 of the inner poppet 134 is provided with an o-ring 139 sized to seal the outlet 112 of the valve 100 when the inner poppet 134 is forced against the chamfered portion 113 of the outlet 112 of the valve.

As will be described more fully below, the combination of the outer poppet 117 and the inner poppet 134 form a telescoping poppet, or flow arresting element, wherein the inner poppet 134 extends through the outer poppet 117 of varying lengths, while remaining permanently anchored within the outer poppet 117. Depending on varying pressure conditions upstream and downstream of the valve, the two poppets will telescope from a fully retracted position when the inner spring 136 is completely extended to a fully protracted position with the second spring 136 fully compressed. The operation of the valve 100 will now be described in detail.

In FIG. 1, the valve is shown in a static condition wherein fluid is present in the valve, but no fluid is flowing through the valve. This condition could occur if an apparatus downstream of the valve drawing fluid from a source upstream of the valve, such as for example a washing machine, completed its cycle and turned off. In this situation, fluid remains in the line, including the valve, and the pressure in the line both upstream of the valve and downstream of the valve is approximately constant. Since the pressure in the upstream side of the valve is approximately equal to the pressure downstream, there is no fluid flow in the line and no pressure differential to move the outer poppet 117. The helical spring 115 forces the outer poppet 117 against the inlet side of the valve with enough force that the o-ring 129 on the outer poppet 117 is compressed between the outer poppet and the chamfered portion 111 of the valve inlet 109. The compression of the o-ring 111 seals the valve in a manner such that no fluid can pass into the flow chamber 110 around the outer poppet 117.

Additionally, the pressure at the inlet 109, and thus at the orifice plate 131, is approximately equal to the pressure at the outlet 112 and in the flow chamber 110. Absent a pressure differential, the second helical spring 136 operates on the head 140 of the inner poppet 134 to force the inner poppet against the orifice plate 131 and prevent fluid from entering the flow cavity 119 through the orifice 133. Therefore, the static flow condition shown in FIG. 1 prevents fluid flow through the valve by completely sealing the inlet 109 of the valve. The valve will remain in this condition until a pressure differential corresponding to a flow rated sufficient to compress the helical spring 115 is experienced by the valve.

Figure 2:
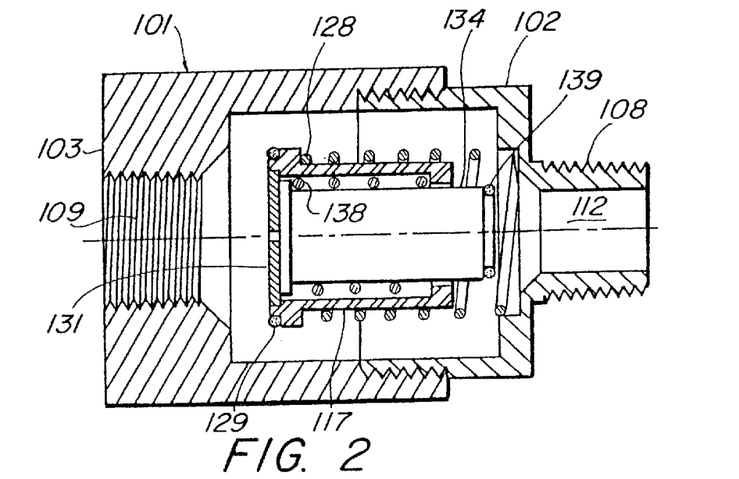
FIG. 2 is a cross sectional view of a preferred embodiment of the present invention illustrating a condition between a minimum flow rate and a maximum flow rate.

In FIG. 2, a flow rate is introduced through the valve by a pressure differential between the downstream condition and the upstream condition. This could occur because the fluid recipient, such as a washing machine, is turned on and the fluid (in this case, water) is allowed to enter the washing machine. The flow of water into the washing machine reduces the pressure downstream, creating a pressure differential between the downstream condition and the upstream condition. Without the valve, the presence of a pressure differential would be enough to generate a fluid flow from the higher pressure upstream to the lower pressure downstream. However, the valve denies a fluid flow below a minimum flow rate governed by the selection of the helical spring 115. The spring is selected so that, below a minimum pressure differential, the force of the spring overcomes the force of the fluid on the orifice plate 131 and the valve remains positioned as shown in FIG. 1. However, if the pressure differential reaches the minimum pressure differential determined by the spring constant of spring 115, the pressure on the orifice plate 131 will be greater than the force of the spring 115, and the two poppets 117,134 will traverse in the valve chamber 110 away from the inlet 109, breaking the seal at the fluid inlet 109.

As FIG. 2 illustrates, if the flow rate remains above the minimum flow rate and below a maximum flow rate, the poppets 117,134 will be located between the inlet side of the valve and the outlet side of the valve, permitting fluid to readily flow around the poppet and through the valve. This is the desirable condition when the system is in operational mode and the spring 115 has been selected for the proper flow conditions for the particular fluid recipient. Each fluid recipient, whether it be a dishwasher, a washing machine, or a natural gas stove, would govern the type of spring used to control the movement of the poppets.

The function of the orifice plate 131 is to regulate the rate at which the inner poppet 117 telescopes. The inner poppet 134 responds to a reduction in the downstream pressure by translating against the force of the inner spring 136 when the pressure differential inside the cavity 119 is greater than the pressure inside the valve chamber 110 by an amount sufficient to collapse the inner spring 136. During nominal flow operation, the downstream pressure is reduced and this reduction in downstream pressure is communicated to the valve chamber 110. However, the pressure in the cavity 119 is slower to equalized (compared to the chamber) because of the size of the orifice 133, which allows fluid to enter the cavity 119. The inner poppet 117 responds to the reduction in the downstream pressure by translating or telescoping from the fully retracted position to an extended position. The differential pressure across the orifice 133 eventually causes fluid to fill the cavity 119 between the inner poppet 134 and the outer poppet 117, until the pressures in the cavity 119 and the chamber 110 are equal. When the cavity 119 equalizes with the valve chamber 110, the inner poppet 134 is no longer subject to a pressure differential and the inner spring 136 returns the inner poppet 134 to its retracted position (as shown in FIG. 2). In this manner, the orifice plate and in particular the orifice itself regulates the rate that the inner poppet telescopes.

The spring 115 selected to control the movement of the outer poppet 117 may be either a single stage spring (constant spring coefficient) or a multistage spring with a variable spring coefficient. A multistage spring could allow different flow regimes where the allowable flow rate is governed by a first stage and the onset of fluid flow governs a second flow regime. Thus, if a flow rate of 12 to 15 gallons per minute is needed for a particular application, it is desirable to have a first stage of spring movement wherein the force from the first 12 gpm results in a negligible movement of the spring, but the force applied from 15 gpm is sufficient to compress the spring fully. Thus, the spring will allow the poppet to reside intermediate to both the inlet and the outlet between pressures corresponding to flow rates between 12 and 15 gpm, and the fluid recipient will operate within the specified flow rate.

Figure 3:
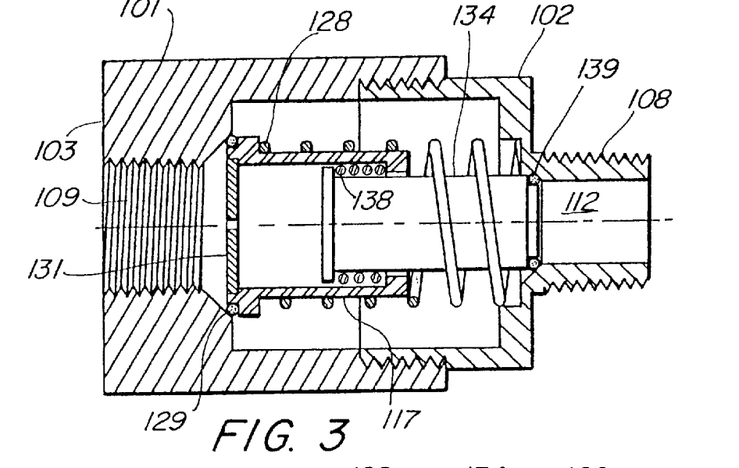
FIG. 3 is a cross sectional view of a preferred embodiment of the present invention in the presence of a leak.

FIG. 3 shows the valve condition in the presence of a small leak downstream of the valve. In many applications it is desirable to halt the flow of fluid when a leak occurs downstream. For example, if the washing machine in the previous example suddenly began to leak water in the non-operating condition, without a valve such as the present invention water could leak indefinitely until discovered, causing damage and even danger. Similarly, in the handling of toxic fluids the importance of the control of leaks are clear. Returning to FIG. 3, the configuration of the valve is initially as that shown in FIG. 1, i.e. a static condition. However, in a small leak condition fluid begins to leak slowly at some point downstream of the valve. Because the inlet side of the valve is sealed below a minimum flow rate, the inlet pressure is isolated from the outlet (or downstream) pressure (see FIG. 1).

As the leak continues, the pressure downstream drops until a pressure differential between the pressure at the inlet 109 and a pressure at the outlet 112 causes the inner poppet 134 to move away from the orifice plate 131, permitting fluid to enter the flow cavity 119. The pressure in the flow cavity 119 approximates the pressure upstream of the inlet, and the difference in pressure between the flow cavity 119 and the flow chamber 110, i.e. the outlet pressure, causes the inner poppet 134 to extend out of the flow cavity 119. When the pressure differential reaches a predetermined value, the inner poppet 134 will "telescope" or extend fully from outer poppet 117 such that the o-ring 139 engages the chamfered portion 113 of the outlet 112. The contact of the o-ring 139 with the outlet closes the flow of fluid through the valve. As long as the leak is present, the downstream pressure will be less than the upstream pressure and the inner poppet 134 will continue to close the valve at the outlet. Thus, the flow of fluid through the valve has been arrested in the presence of a small downstream leak.

Figure 4:
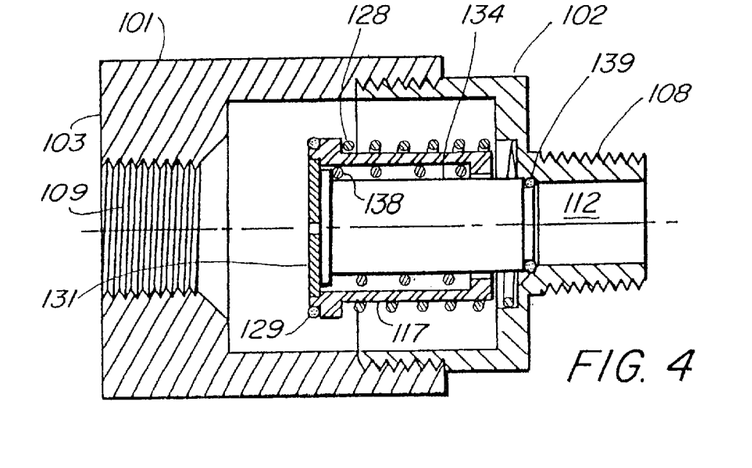
FIG. 4 is a cross sectional view of a preferred embodiment of the present invention illustrating a condition above a maximum flow rate.

FIGS. 3 and 4 illustrate the two stages that the valve undergoes in the presence of a large leak, i.e. a sudden loss of pressure downstream of the valve. In this scenario, the equilibrium of FIG. 1 is disturbed when pressure is suddenly lost at the outlet side of the valve, causing the outer poppet 117 to compress the spring completely (FIG. 4). The inner poppet 134, protruding from the outer poppet 117, reaches the outlet 112 and in cooperation with the o-ring 139 seals the outlet of the valve. This condition is shown in FIG. 4. With the flow of fluid now arrested by the sealing of the outlet, the pressure in the flow chamber 110 quickly equalizes to the inlet pressure causing the spring 115 to return the outer poppet 117 to its static position abutting the inlet. However, the pressure differential between the inlet 109 and the outlet 112 still exists, and the inner poppet 134 remains extended or telescoped by the pressure differential. Thus, after the equalization of the flow chamber the valve is configured the same as condition as FIG. 3, i.e., the outer poppet 117 is maintained against the inlet 109 sealing the inlet except for the orifice 133 which feeds the flow cavity 119, and the inner poppet 134 is forced against the outlet 112 and seals the outlet from flow through the valve. Thus with either a small leak or a large leak the valve eventually ends up closing the valve as shown in FIG. 3.

The valve may be optionally equipped with a throttling region 141 just outside the chamfered section 111 of the inlet, shown in FIG. 1 as a narrowing or necking of the flow chamber. The length and tolerances of the throttling region is determined by the particular application. The function of the throttling region controls the amount of fluid escaping past the poppets during the transition stage between static and normal flow conditions. As the outer poppet transitions away from the inlet, the pressure drop decreases as the amount of fluid increases, which in turn affects the way the valve opens. The use of a throttling region can be used in place of a multistage spring to provide a first flow regime in the transition stage of the valve and a second regime in the normal flow stage of the valve. The throttling region could vary in diameter or have a constant diameter, depending on how the throttling region is to be used. In FIG. 1, a constant diameter throttling region is depicted. Conversely, the valve can operate without a throttling region, where the inlet opens up directly to the full flow chamber.

Figure 5:
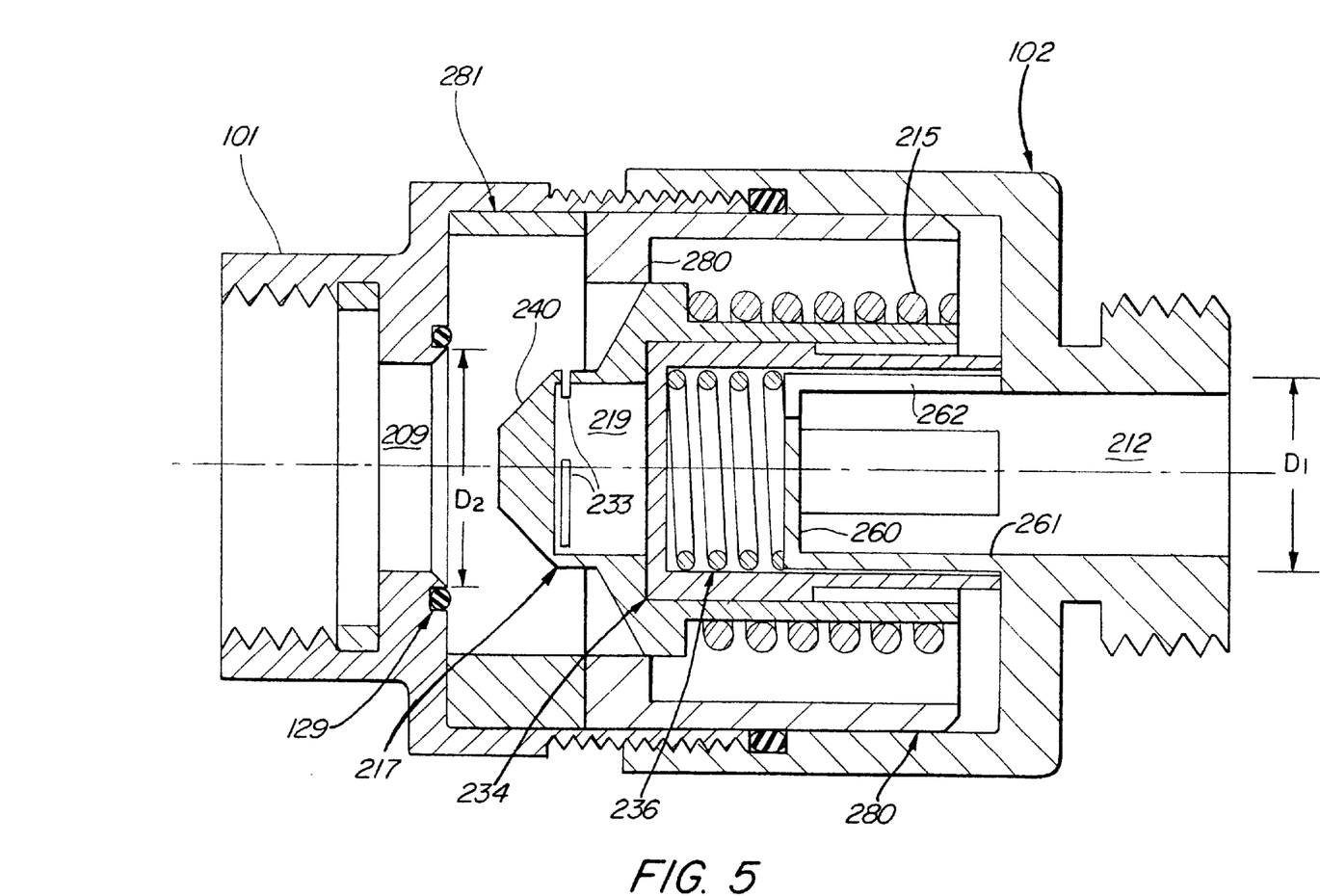
FIG. 5 is a cross sectional view of a second preferred embodiment of the present invention.

Another embodiment of the present invention is depicted in FIG. 5, and will be described herein with respect to a design for a washing machine. It is to be understood that the applications for the valve are far-reaching, and that the descriptions herein applied to a particular application are provided to better illustrate the operation of the valve, and not to limit its use in any way.

A washing machine supply hose is typically hidden from normal view and is usually not the subject of frequent inspections in most homes and Laundromats. Although a rupture in the hose is possible, a more likely event would be the onset of a small drip or spray that gradually advances to a more severe leak over time. One purpose of the present invention is to prevent a major event by closing the valve upon the detection of a minor leak. In tests conducted on the present invention, the valve was shown to close upon the condition of an eleven drops per second leak.

A supply pressure for a typical washing machine solenoid valve is approximately twenty-two psig, providing a five gallon per minute flow rate through a six foot long washing machine hose. Due to the nature of the flow and pressure loss through household piping, when two water supplies are provided (hot and cold) the combined flow results in a pressure of approximately fifteen psig and a flow rate of almost seven gallons per minute.

Based on these approximations, a normal home water supply system would allow between 3.4 and 5 gallons per minute through a single water supply from the shutoff valve. To provide adequate tolerances on the range, the low end was designed for flow rates below one gallon per minute and the high range was designed for seven and a half gallons per minute.

In the second embodiment of the present invention shown in FIG. 5, it may be initially noted that the internal diameter $D_1$ of the outer poppet 217 is approximately the same as the diameter $D_2$ of the inlet at the O-ring 129. This provides an approximately equal hydraulic pressure at the interior 219 of the outer poppet 217 and the valve inlet pressure, which has the effect of decoupling the differential pressure across the valve from the movement of the inner poppet 234. To equalize the pressure inside of the outer poppet 217, a series of radially spaced slots or openings 233 are located on forward portion of the outer poppet 217, which has been modified to have a generally conical portion 240 at the inlet 209. The openings 233 equalize the pressure inside the outer poppet 217 like the orifice of the previous embodiment. By placing the openings 233 on the side of the conical portion 240, the pressure that is communicated to the interior 219 of the outer poppet 217 is the static pressure inside the valve.

The movement of the inner poppet 234 is controlled predominantly by the pressure balance between the leakage into the interior 219 of the outer poppet 217 through the radial openings 233, and the pressure in the inner poppet 234 (i.e., the outlet or downstream pressure). To further isolate the movement of the inner poppet 234 from the movement of the outer poppet 217, the spring 236 that controls the inner poppet 234 is biased not against the outer poppet 217 as in the previous embodiment, but rather against a crown 260 at the outlet as shown. The crown 260 over the outlet can be integrally formed in the outlet portion of the valve to support the inner poppet spring 236 with legs 261 spaced by circumferential gaps 262 that allow the fluid to flow through and around the crown 260. The crown 260 could, of course, also be a separate component not integrally formed in the valve outlet. The presence of the crown 260 may allow the O-ring at the outlet to be eliminated if the mating of the inner poppet 234 with the base 270 adjacent the outlet 212 is sufficiently tight to seal the outlet with the inner poppet 234.

In the embodiment shown in FIG. 5, under static flow conditions the outer poppet 217 rests against the O-ring 129 of the inlet 209 and the inner poppet 234 is biased against the outer poppet 217. No flow is present in this condition. Upon a pre-leak condition (up to about eleven drops of water per second downstream of the valve), the outer poppet 217 remains against the O-ring 129 while leakage begins to seep into the outer poppet through the radial openings 233 at the same pressure as the supply pressure, thereby preventing a pressure drop at low leakage. The leakage in the outer poppet passes through the close clearance between the inner and outer poppets and is communicated out of the valve. Further, the spring 236 controlling the inner poppet 234 begins to compress due to the differential pressure across the inner poppet, but the inner poppet is still biased toward the outer poppet until the spring force is completely overcome (See, e.g., FIG. 7).

If the leak progresses to the low leak condition (above eleven drops per second for example), the pressure differential across the inner poppet 234 is sufficient to compress the inner poppet spring 236 causing the inner poppet 234 to extend out of the outer poppet 217 to contact the wall 270 adjacent the outlet. The pressure is sufficient to completely seal the outlet, causing the pressure at the outlet to drop to zero (atmospheric pressure) as the water pressure in the leaking hose is relieved. The outer poppet 217 remains seated against the inlet 209 at the O-ring 129, and fluid through the valve is halted. The objective of the present invention is thus achieved.

At the normal operation flow condition (up to high flow shutoff condition), a sudden increase in the flow from the static condition to the operating condition initially causes the outer poppet 217 and the inner poppet 234 to move away from the inlet 209 due to the reduced pressure at the outlet 212 causing a sufficient pressure differential to partially collapse the outer poppet spring 215. The suddenness of the flow will typically be such that flow will not have time to equalize through the radial openings 233 before the outer poppet spring 215 collapses. The flow travels around the outer poppet 217 and inner poppet 234, and through the outlet 212 to the fluid recipient device. Once flow is established, the flow across the conical portion 240 of the outer poppet 217 results in a reduced pressure at the radial openings 233 due to their location in the flow, which in turn tends to create a lower pressure that holds the inner poppet 234 against the outer poppet 217 during normal flow conditions. The distance that the outer poppet 217 moves off of the O-ring 129 is controlled by the spring stiffness of both springs 215,236.

At the high flow shut-off condition, such as a sudden and complete loss of pressure downstream of the valve or an increasing leak condition beyond the design limit, the poppet assembly moves off of the O-ring 129 toward the valve outlet 212. At some design point, the outer poppet 217 will approach the throttle ring 280 located along the outer poppet path. The throttle ring 280 is an annular component sized to mate with the outer poppet when the outer poppet passes into the throttle ring, thereby effectively choking off fluid flow through the valve. The throttle ring 280 can be integrally formed as part of the valve interior, or can be a separate component that fits within the valve interior. A spacing ring 281 can optionally be included to provide variability with respect to the location of the throttle ring 280 within the valve, i.e., a different spacer 281 can be used to move the throttle ring 280 toward the outlet 212 or toward the inlet 209 to meet the requirements of the specific valve.

Figure 6:
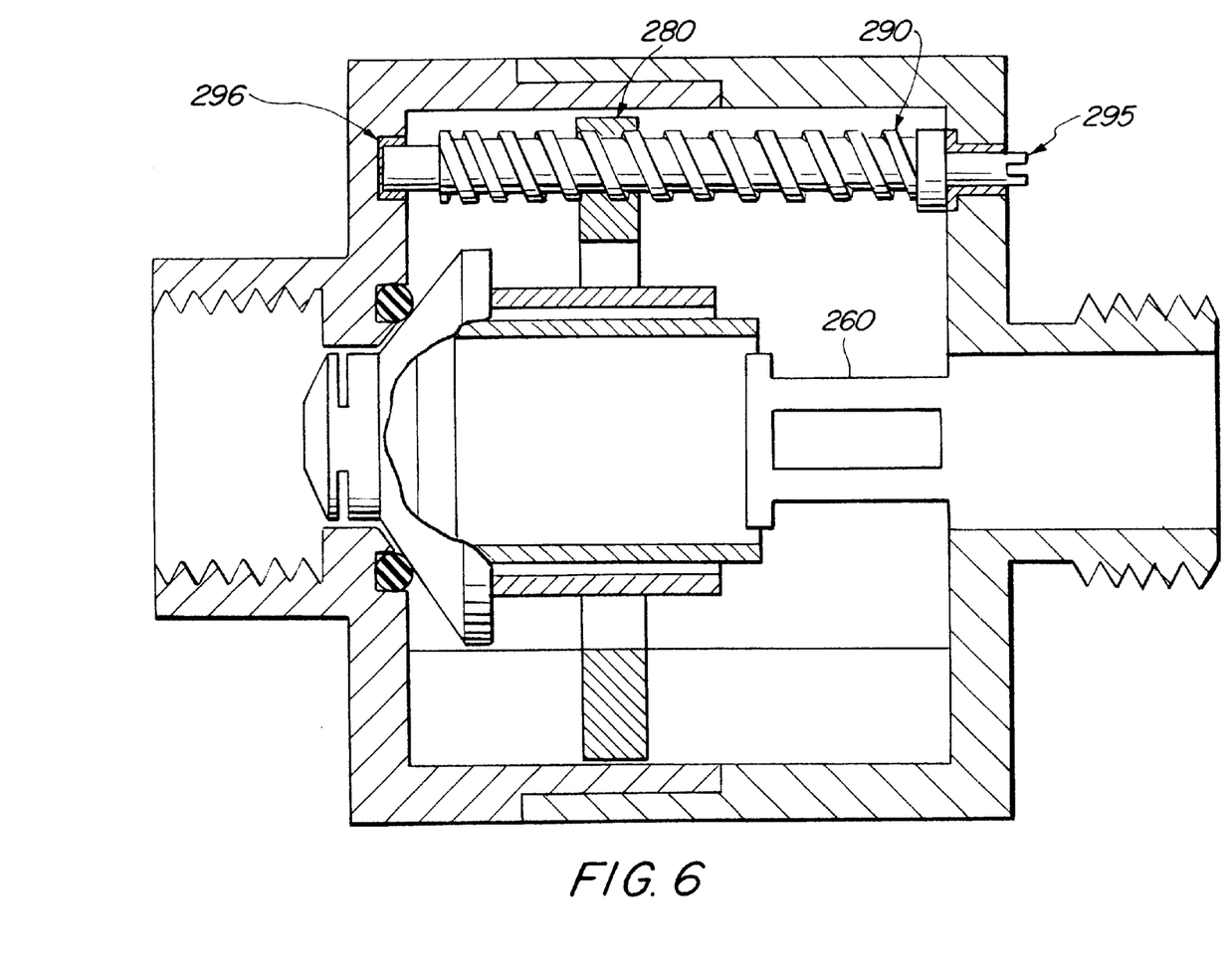
FIG. 6 is a cross sectional view of an embodiment illustrating a variable throttle ring.

FIG. 6 shows an alternative embodiment to the spacer to set the position of the throttle ring. In FIG. 6, the position of the throttle ring 280 is moved longitudinally in the valve by a worm gear 290 arrangement that is activated outside the valve via a slotted element 295. The worm gear 290 is fixed at one end of the valve using a bushing inset 296 in the valve housing, and terminates at the other end in a cooperating slotted element 295 rotatably fixed in the valve. The slotted element 295 is sealed to be fluid tight while extending outside the valve to provide an external access to the throttle ring position inside the valve. Using a flat blade tool such as a screw driver, the slotted element 295 is rotated which in turn rotates the worm gear 290. A mating element on the throttle ring 280 converts the rotation of the worm gear 290 into a longitudinal translation of the throttle ring 280 thereby positioning the throttle ring 280. A throttle ring position toward the front of the valve will reduce the high flow condition necessary to lock the valve, while moving the throttle ring toward the outlet will increase the high flow rate that interrupts the fluid flow. FIG. 6 also illustrates the crown 260 used to support the inner poppet spring.

At the point where the outer poppet 217 reaches the throttle ring 280, the pressure in the valve interior and through the radial openings 233 is the supply pressure, while the pressure downstream of the inner poppet 234 is much lower causing the inner poppet spring 236 to collapse and the inner poppet 234 to seal the valve. Once the inner poppet 234 shuts off the flow, the pressure throughout the interior of the valve will equalize and the spring force on the outer poppet 217 via spring 215 will restore the outer poppet 217 to the inlet side against the O-ring 129. No fluid will flow through the valve until the valve is reset.

Figure 7:
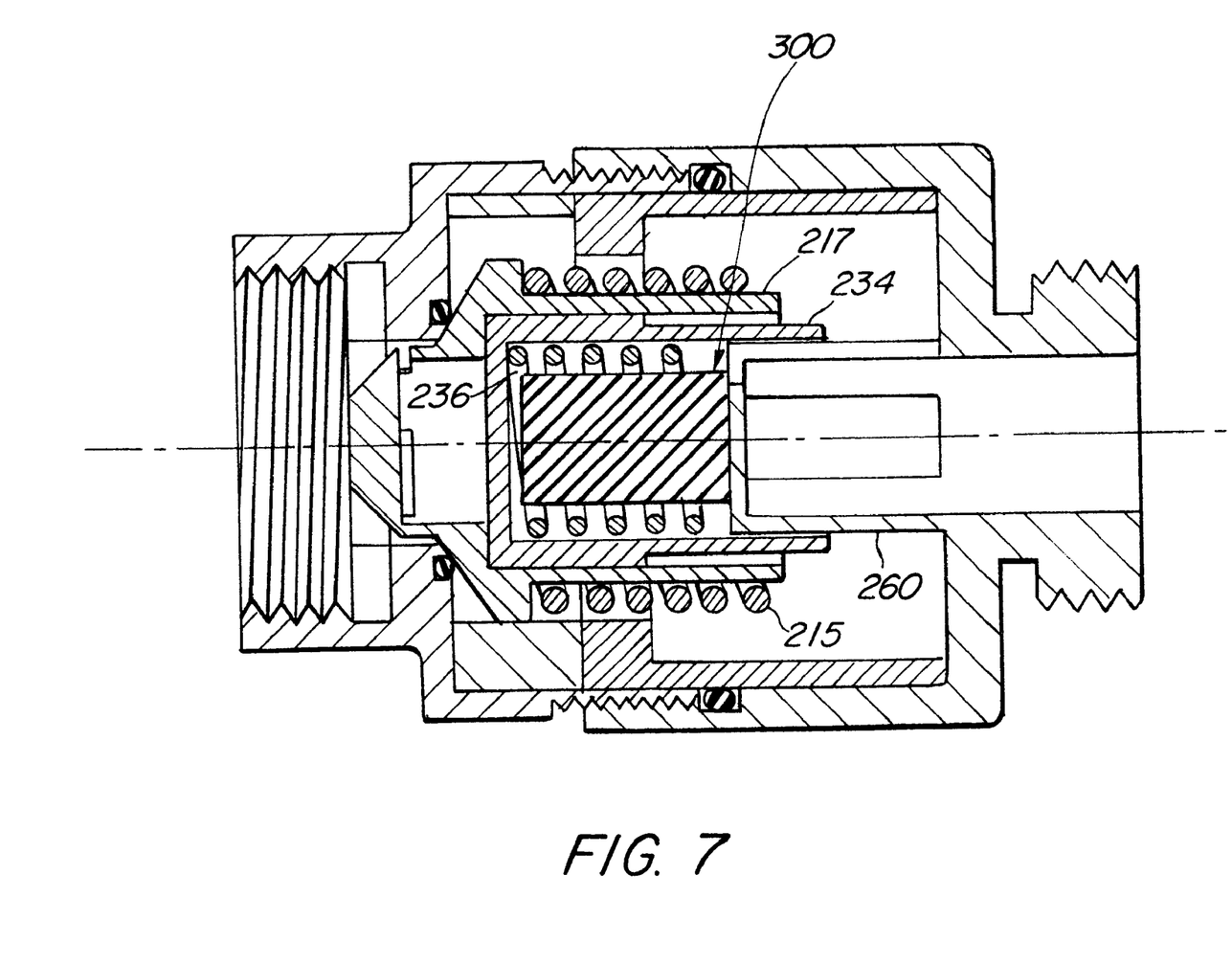
FIG. 7 is a cross sectional view of the embodiment of FIG. 5 showing a dissolvable catch inside the valve.

The valve has been fabricated and tested, and it has been found to perform as described for each of the conditions described above. One consideration in the use of the valve is the initial installation. Since the pressure will usually be reduced to atmospheric to install the valve, unless something is done to prevent it the first request for fluid will trigger the high flow condition thereby locking the valve. There are several solutions to the dilemma. The first solution shown in FIG. 7 provides the valve with a fluid soluble spacer 300 to prevent the inner poppet from closing the outlet. A water soluble polymer, salt, or other structure that erodes in the presence of the fluid can be placed in between the outlet and the inner poppet to prevent the closure of the valve while the initial flow condition upon start up equalizes to a steady state condition. Upon reaching steady state, the water soluble obstruction dissipates and the valve may operate as intended. The operation of the water soluble obstruction is a one-time use only.

Figure 8A:
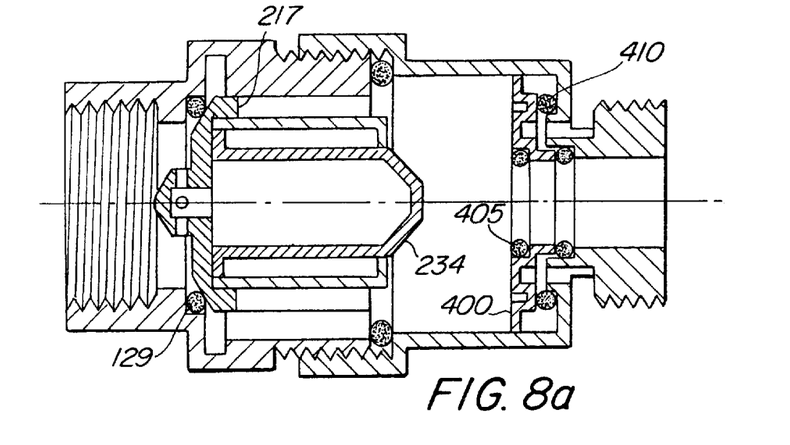
FIG. 8 is a cross sectional view of a preferred embodiment illustrating a reset mechanism.
Figure 8B:
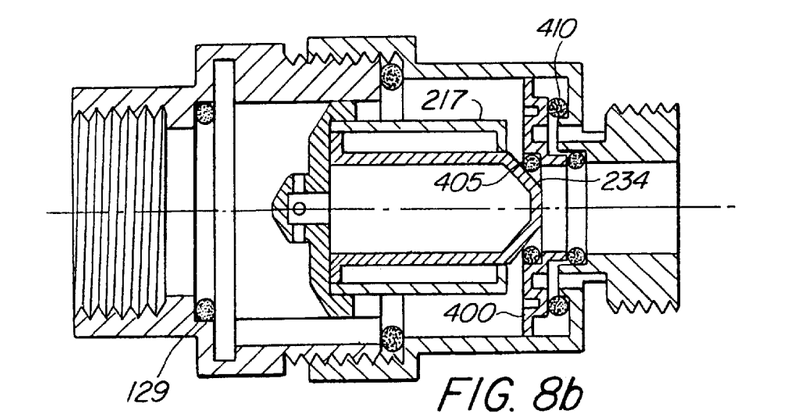
Figure 8C:
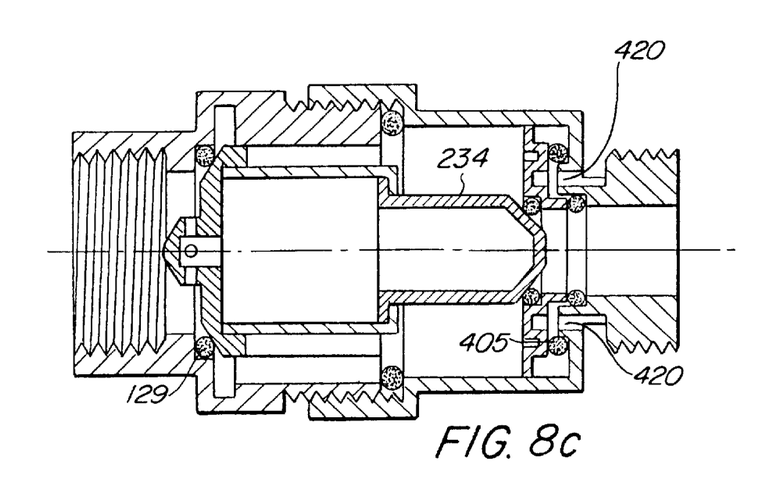

Another solution is to provide the valve with a reset mechanism to restore the valve without disassembling the valve. FIG. 8 shows a reset mechanism for use with the present invention. FIG. 8*a* shows a valve in the static flow condition with an annular washer 400 adjacent the outlet of the valve. The washer 400 has an O-ring 405 sized to seal the inner poppet 234 when engaged, and a second O-ring 410 behind the washer 400 to seal the fluid that escapes around the washer. In FIG. 8*b,* the high flow condition is depicted where the poppet assembly is moved against the spring force to close the flow by abutting the washer 400 and engaging the O-ring 405. Flow around the washer 400 is sealed by the second O-ring 410. With the flow arrested, the outer poppet 217 recedes to its position in FIG. 8*c* with the outer poppet against the O-ring 129 and the inner poppet 234 against the O-ring 405. In this embodiment, small pin holes 420 have been located in the valve at the outlet portion such that the washer 400 can be moved by a small instrument (not shown) through the pin hole 420. If the washer 400 is moved off of the O-ring 405, the fluid will flow around the washer and into the outlet, rapidly equalizing the pressure between the source and the downstream condition. As equilibrium is reached, the inner poppet 234 will be forced back into the outer poppet 217 by the spring 236 and the valve will be reset. The foregoing describes one method for resetting the valve without disconnecting the valve from the supply line. This method may also be used to prime the valve prior to and after It is envisioned that there are many other applications for the valve of the present invention through minor deviations in geometry, material selection and throttling technologies. The concept of the present flow arresting valve can not only be used for residential water, but it can be used for industrial, refinery, marine, municipal, petrochemical, hospital and medical applications. The present invention is ideally suited for any application of a fluid conduit for either liquid or gas that has a requirement to not allow, or to minimize, spills as a result of very low or very high leak rates. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A flow control valve comprising:
    a housing defining a flow chamber therein including an inlet and an outlet;
    a first poppet adapted to seal the inlet and biased against the inlet by a first biasing element, said first poppet including an interior compartment in fluid communication with said flow chamber via at least one hole in the first poppet; and
    a second poppet at least partially disposed within said interior compartment of the first poppet, the second poppet biased inward into the first poppet compartment by a second biasing element and further adapted to seal the outlet when a pressure differential overcomes a biasing force of the second biasing element.

2. The flow control valve of claim 1 further comprising a throttling ring to choke the flow of fluid when the outer poppet engages the throttling ring.

3. The flow control valve of claim 2 wherein a position of the throttling ring within the valve can be adjusted.

4. The flow control valve of claim 3 wherein the position of the throttling ring is positioned by a spacer.

5. The flow control valve of claim 3 wherein the position of the throttling ring is adjustable without accessing the interior of the valve.

6. The flow control valve of claim 5 wherein the position of the throttling ring is controlled by a worm gear actuated at the exterior of the valve.

7. The flow control valve of claim 1 further comprising a water soluble element for preventing the valve from arresting flow until an equilibrium condition is met, whereupon the water soluble element dissipates into the flow.

8. The flow control valve of claim 1 further comprising a reset mechanism for moving the second poppet away from its sealing relationship with the outlet until an equilibrium condition is achieved.

9. The flow control valve of claim 8 wherein the reset mechanism comprises a washer element sealing connected with the second poppet and the outlet, and access means for moving the washer out of the sealing connection with the outlet.

10. A flow control valve having an inlet and an outlet comprising:
    an expandable flow arresting member including a first end adapted to block said inlet when the pressure at the inlet is not greater than a first biasing force, and further including a second end adapted to block said outlet when the pressure inside said expandable flow arresting member is greater than a second biasing force, and wherein the expandable flow arresting member has openings therein to communicate fluid into the expandable flow arresting member.

11. The flow control valve of claim 10 wherein the blocking of the outlet by the second end will result in the blocking of the inlet by the first end.

12. The flow control valve of claim 11 further including a washer member inside the valve that mates with the second end of the flow arresting member to seal the valve when the pressure inside the expandable flow arresting member is greater than the second biasing force, and also including an access to the washer member from outside the valve for disturbing the seal between the second end and the member to reset the valve.

13. The flow control valve of claim 10 wherein the flow control valve also includes a dissolvable catch that prevents the valve from closing during an initial installation period.

14. The flow control valve of claim 10 further including an annular throttle ring sized to receive the outer poppet to choke the flow of water in the valve and positioned within the valve according to close the valve at a predetermined flow condition.

15. The flow control valve of claim 14 where the annular throttle ring is adjustably positioned within the flow control valve.

16. The flow control valve of claim 15 where the position of the annular throttle ring is adjusted mechanically from outside the valve.

17. The flow control valve of claim 15 where the position of the annular throttle ring is adjusted using a spacer.

* * * * *